US005498046A

United States Patent [19]
Ridley, Sr. et al.

[11] Patent Number: 5,498,046
[45] Date of Patent: Mar. 12, 1996

[54] MANUAL SCOOP AND RAKE SYSTEM FOR COLLECTING LEAVES AND OTHER LIGHT DEBRIS

[76] Inventors: Andre T. Ridley, Sr.; Andrea Ridley; Andre Ridley, Jr., all of 154 Needham St., Newton, Mass. 02164

[21] Appl. No.: 234,428

[22] Filed: Apr. 28, 1994

[51] Int. Cl.[6] ................................................. B65B 67/04
[52] U.S. Cl. ........................... 294/1.1; 294/55; 15/257.1
[58] Field of Search ........................... 294/1.1, 1.3–1.5,
294/25, 55, 55.5, 57; 15/257.1, 257.3, 257.9;
141/108, 313, 314, 391; 248/95, 99, 101

[56] References Cited

U.S. PATENT DOCUMENTS

| | | | |
|---|---|---|---|
| 263,726 | 9/1882 | Riley | 294/25 X |
| D. 334,638 | 4/1993 | Blackman | 294/1.3 |
| 571,513 | 11/1896 | Davidson | 294/55 X |
| 1,167,782 | 1/1916 | Richards | 294/55 X |
| 2,180,544 | 11/1939 | Nissen | 294/55.5 |
| 2,546,113 | 3/1951 | Spang | 294/1.1 |
| 3,477,756 | 11/1969 | Castro | 294/25 X |
| 4,149,745 | 4/1979 | Willis | 15/257.1 X |
| 4,312,531 | 1/1982 | Cross | 294/55 |
| 4,470,627 | 9/1984 | Carroll et al. | 294/55 |
| 4,629,233 | 12/1986 | Pfisterer | 294/1.1 |
| 4,832,292 | 5/1989 | Beckham | 248/99 |
| 4,888,846 | 12/1989 | Natale | 294/25 X |
| 4,969,675 | 11/1990 | Zahrowski | 294/1.3 |
| 5,014,943 | 5/1991 | Nelson et al. | 248/99 |
| 5,065,965 | 11/1991 | Aulabaugh | 248/99 |
| 5,107,666 | 4/1992 | Rahtiean | 56/202 |

*Primary Examiner*—Dean Kramer
*Attorney, Agent, or Firm*—Choate, Hall & Stewart

[57] ABSTRACT

A system for collecting leaves and other light debris comprises: a collector and a rake which can be manipulated readily to facilitate stashing materials in plastic bag. The collector includes a generally conical body portion that rearwardly converges along an axis to a generally circular egress, a forwardly projecting scoop portion that defines with the body portion a frustro-circular ingress, and a handle portion that adjoins the body portion along the axis, the scoop portion and the handle portion being diametrically opposed with respect to the axis. The rake includes, along an axis of elongation, a forward claw having projecting downwardly curved talons, a rearward cuff that is adapted to envelop the arm of an operator, and a medial transverse handle that is adapted to be gripped by the hand of an operator. The system is such that an operator, (1) with one hand, can grasp the collector handle and an edge of a plastic bag in order to hold the mouth of the bag in position about the collector's ingress, and (2) with the other hand and arm, can engage the rake handle and cuff by which to control the claw in order to sweep the leaves and other light debris into the collector's ingress.

1 Claim, 5 Drawing Sheets

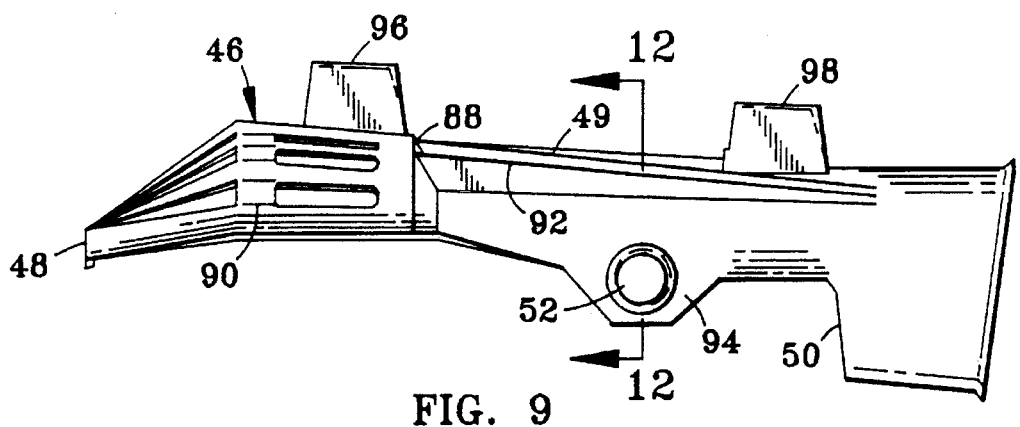
FIG. 9
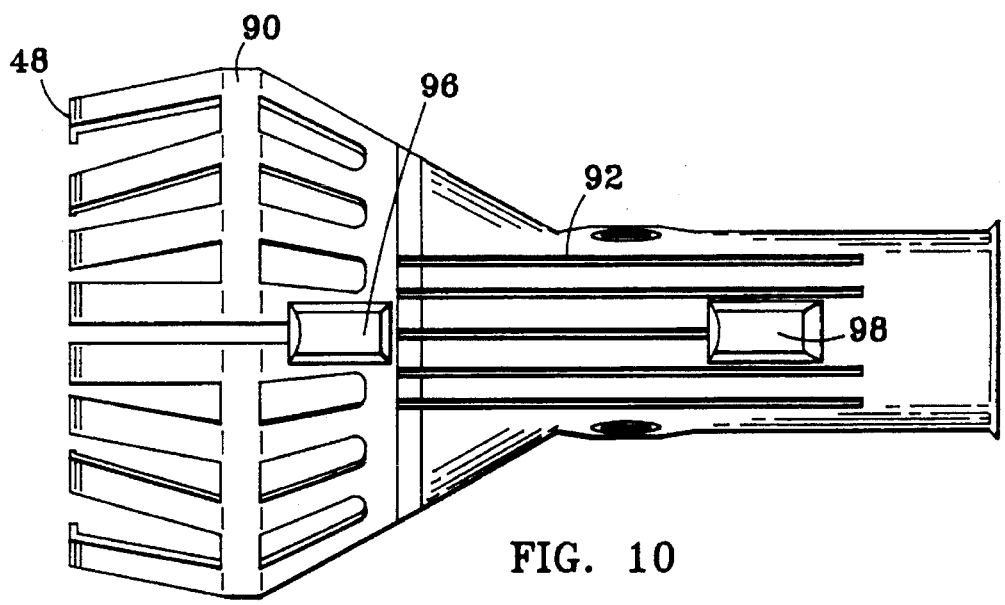
FIG. 10
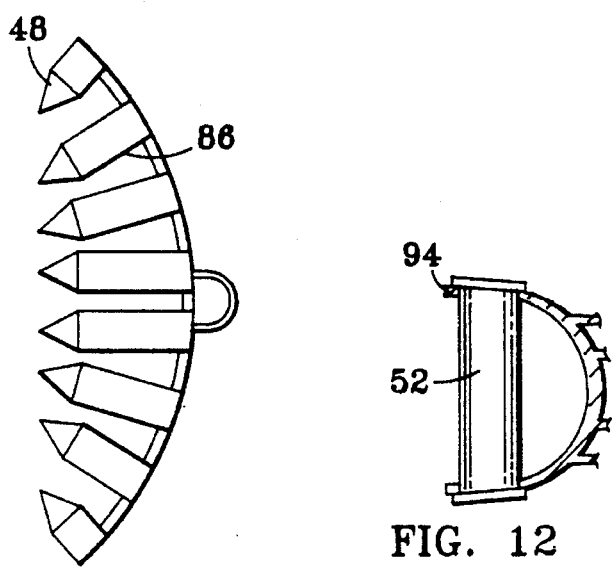
FIG. 11
FIG. 12
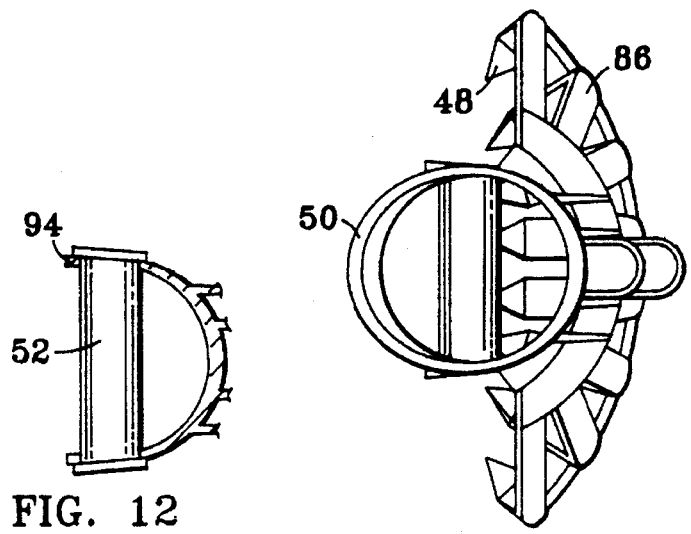
FIG. 13

MANUAL SCOOP AND RAKE SYSTEM FOR COLLECTING LEAVES AND OTHER LIGHT DEBRIS

BACKGROUND OF THE INVENTION

1. Field of the Invention

The present invention relates to the manual collection of leaves and other light debris and, more particularly, to a scoop and a rake which can be manipulated readily to facilitate the collection of leaves and other light debris in plastic bags.

2. Background of the Invention

Home owners and others are well aware of difficulties that typically are encountered when manually collecting leaves and other light debris, and stashing them into plastic bags. One procedure is for a person to hold a plastic bag open in contact with the ground by one hand, and to rake the debris into the open end of the bag with a long handle rake which is held by the other hand close to the rake head. Another procedure involves two persons, one of whom holds the plastic bag open with both hands and the other of whom collects heaps of debris with both hands and deposits them in the plastic bag. These procedures are unwieldy. Still another procedure involves a specially designed collector in the form of an open bottom barrel, the open bottom of which is enveloped by the open top of a plastic bag to be filled, and the open top of which rests on the ground for reception of the debris. Specially designed collectors of this type have been a step in the right direction, but their specific constructions, have not been conducive to the facility and efficacy that are desired.

GENERAL DESCRIPTION OF THE INVENTION

The object of the present invention is to provide, for the collection of leaves and other light debris, a manual system having as primary components a collector and a rake which can be manipulated readily to facilitate stashing these materials in plastic bags.

The collector includes a generally conical body portion that rearwardly converges along an axis to a generally circular egress, a forwardly projecting scoop portion that defines with the body portion a frustro-circular ingress, and a handle portion that adjoins the body portion along the axis, the scoop portion and the handle portion being diametrically opposed with respect to the axis.

The rake integrally includes, along an axis of elongation, a forward claw having projecting downwardly curved talons, an intermediate sheath, a rearward cuff that is adapted to envelop the arm, and a medial transverse handle that is adapted to be gripped by the hand.

The arrangement is such that an operator, (1) with one hand, can grasp the collector handle and an edge of the plastic bag in order to hold the mouth of the bag in position about the collector's ingress, and, (2) with the other hand and arm, can engage the rake handle and cuff by which to control the claw in order to sweep the leaves and other light debris into the collector's ingress.

The invention further includes features of the collector separately and features of the rake separately, the collector and the rake each being novel per se. These features will be described in detail below.

BRIEF DESCRIPTION OF THE DRAWINGS

For a fuller understanding of the nature and objects of the present invention, reference is made to the following specification, which is to be taken in connection with the accompanying drawing, wherein:

FIG. 9 is a side elevation view of the rake of FIG. 1;

FIG. 10 is a top plan view of the rake of FIG. 9;

FIG. 11 is a front view of the rake of FIG. 9;

FIG. 12 is a cross-sectional view of the rake of FIG. 9, taken along the line 12—12; and FIG. 13 is a rear view of the rake of FIG. 9.

DETAILED DESCRIPTION OF THE PREFERRED EMBODIMENT

Figure 1:
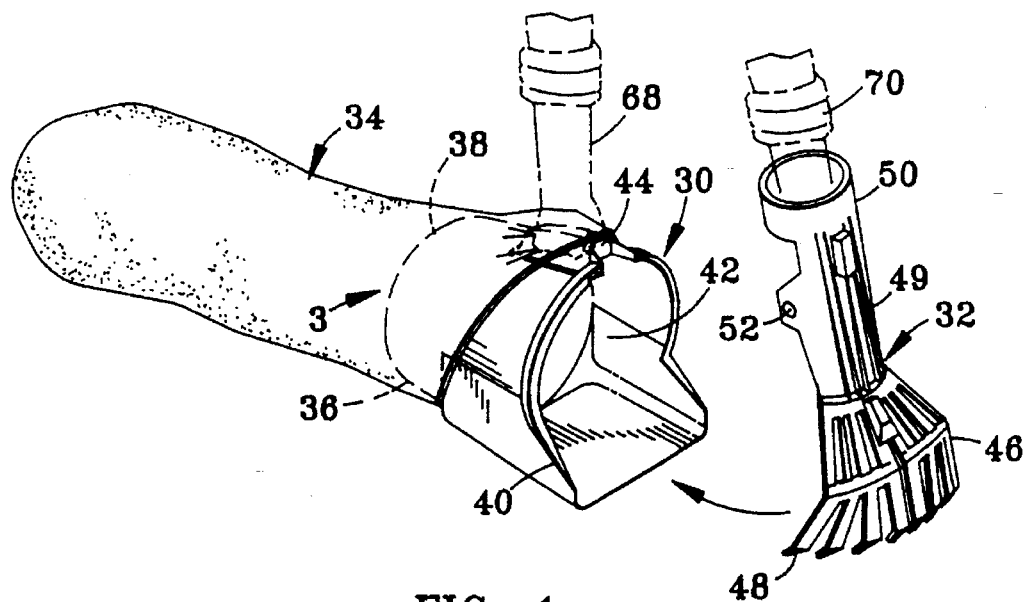
FIG. 1 is a pictorial sketch illustrating the collector and rake in operation, together with a plastic bag.
Figure 2:
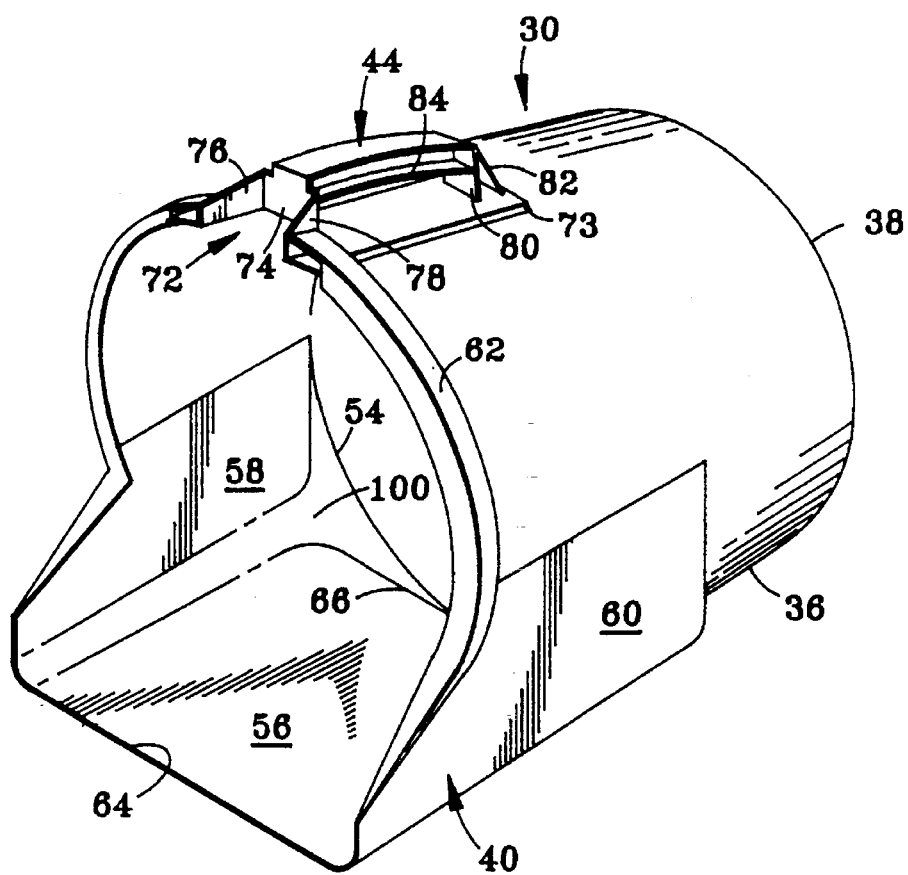
FIG. 2 is an isometric view of the collector.

The Collector and Rake system of FIG. 1.

A preferred embodiment of the system of the present invention is shown in FIG. 1 as comprising a collector 30 and a rake 32 which can be manipulated readily to facilitate the sweeping of leaves and/or other light debris into a plastic bag 34.

Collector 30 integrally includes a generally conical body 36 that rearwardly converges along an axis toward a generally circular egress 38, a forwardly projecting scoop 40 that defines with the body a frustro-circular ingress 42, and a handle 44 that adjoins the body along its axis. In other words, the direction of elongation or axis of the handle lies in the same geometrical plane as the axis of body 36. Scoop 40 has a flat bottom that is adapted to rest on the ground. The scoop and the handle are diametrically opposed with respect to the axis of the body.

Rake 32 includes, along an axis of elongation, a forward claw 46 having projecting downwardly bent talons 48, an intermediate sheath 49, a rearward cuff 50 that is adapted to envelop the arm, and a medial transverse handle 52 that is adapted to be gripped by the hand.

The Collector of FIGS. 2–8

Figure 3:
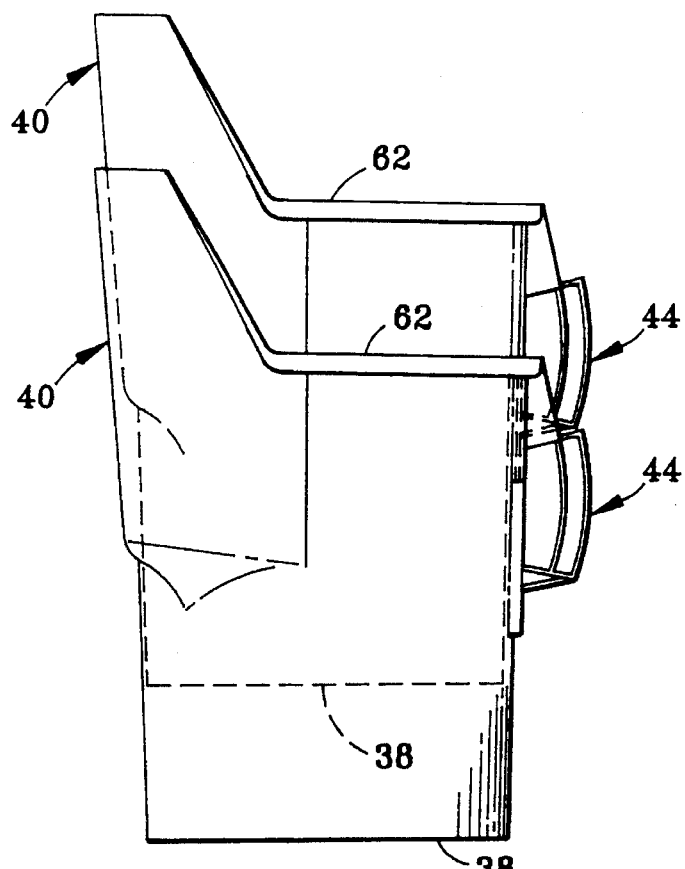
FIG. 3 shows a plurality of collectors in stacked condition for storage or transport.
Figure 4:
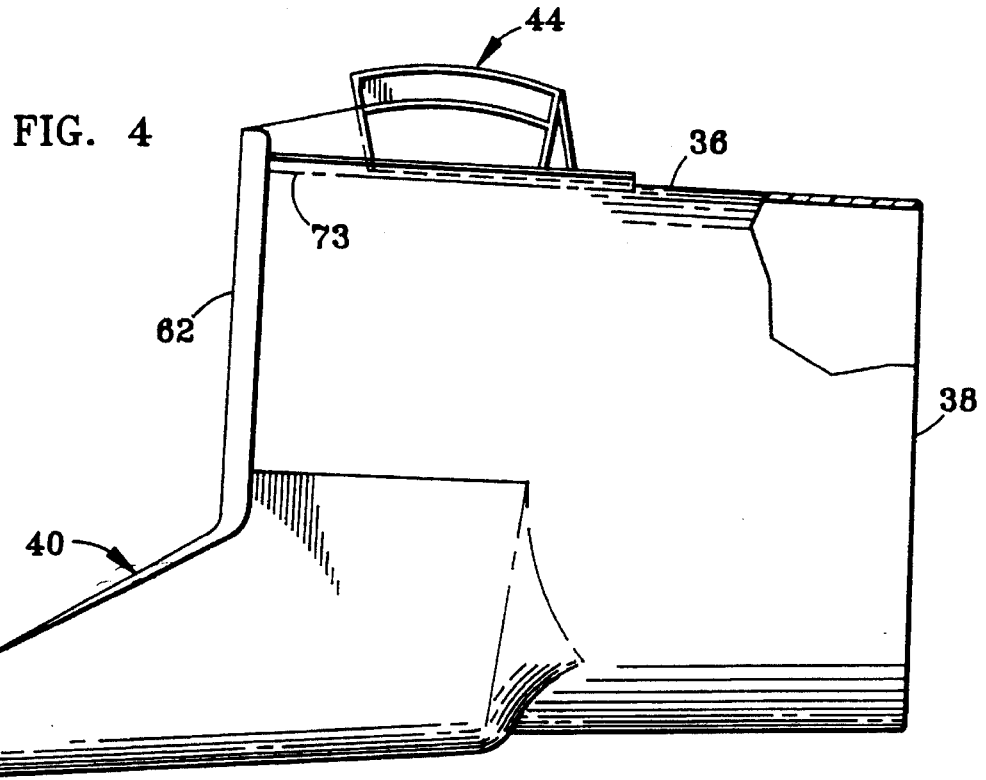
FIG. 4 is a side elevation of the collector of FIG. 2.
Figure 5:
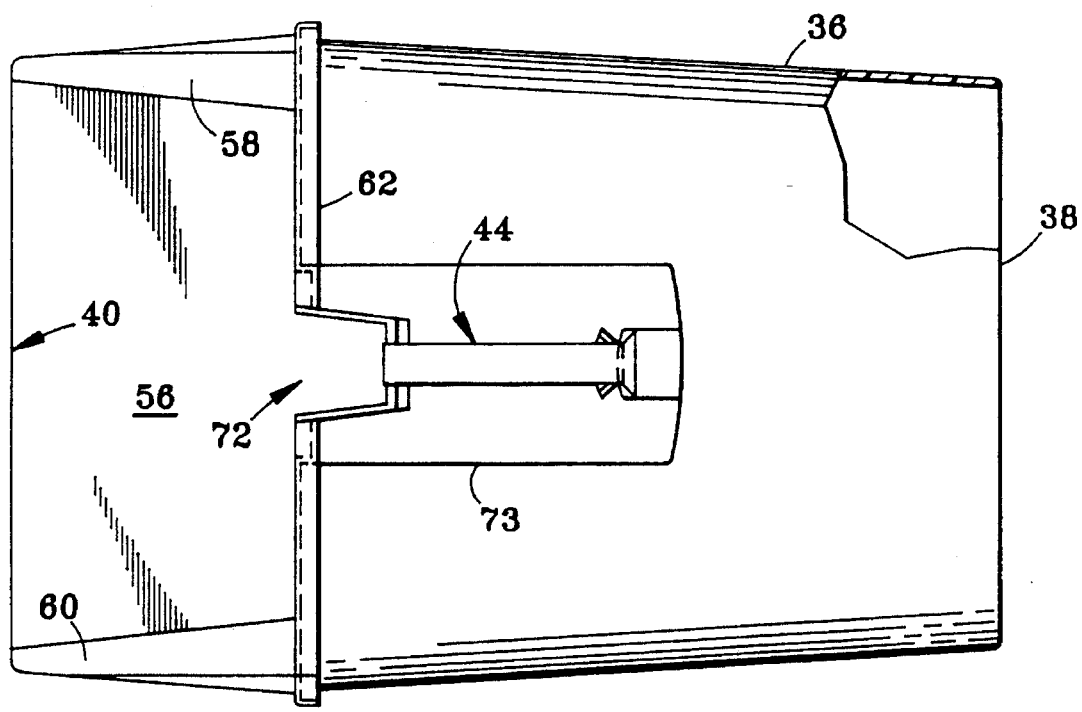
FIG. 5 is a top plan view of the collector of FIG. 2.
Figure 6:
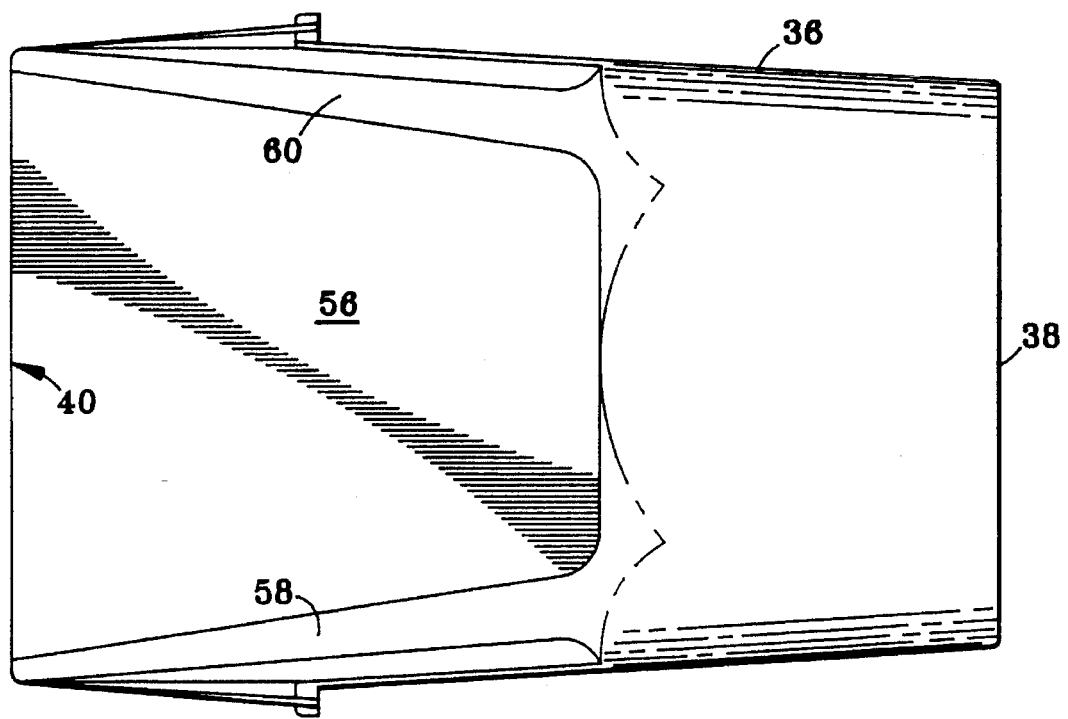
FIG. 6 is a bottom plan view of the collector of FIG. 2.
Figure 7:
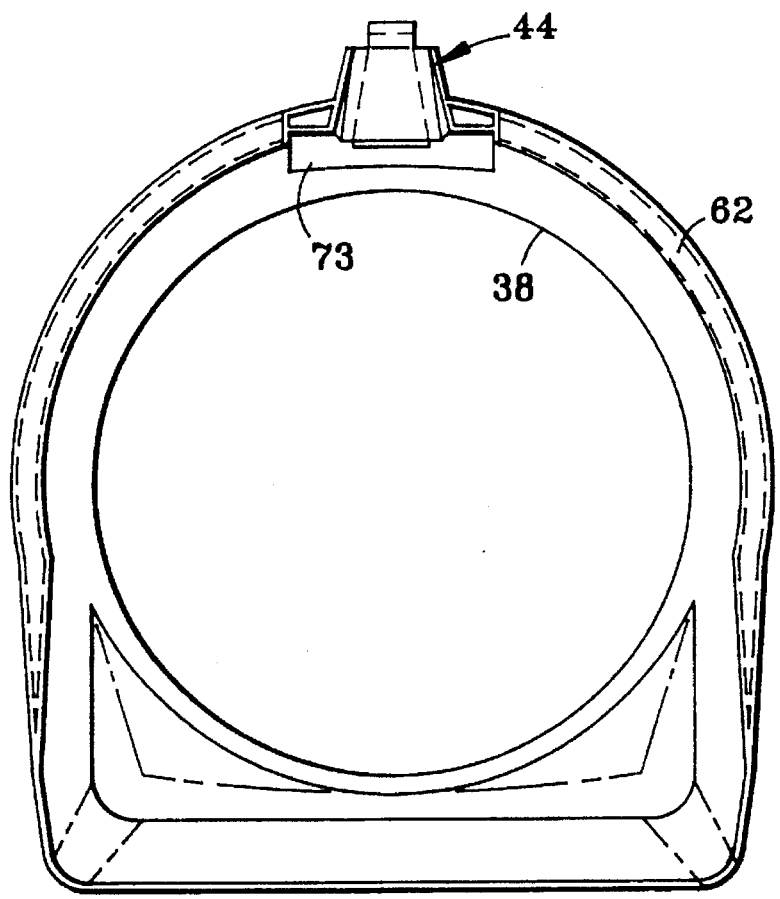
FIG. 7 is a front elevation of the collector of FIG. 2.
Figure 8:
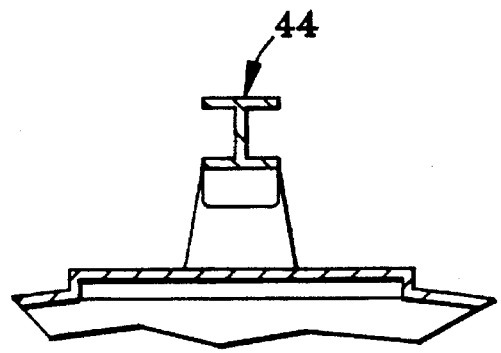
FIG. 8 is a broken away, cross-sectional view of the handle portion of the collector of FIG. 2.

The configurations in collector 30 of body 36, scoop 40 and handle 44 permit compact stacking for storage and transport as shown in FIG. 3, as well as efficacious use as shown in FIG. 1. Body 36 is slightly conical in shape from a medial location 54, at which its cross-section is circular, to its rearmost location at egress 38 at which its cross section is circular. Circular cross section 38 has a smaller diameter than circular cross section 54.

Scoop 40 has the configuration of a chute which includes a bottom blade 56 and a pair of opposed walls 58, 60. Blade 56, which is flat, is tangent to body 36 and generally continues at the same conical angle as does the body with respect to the body's axis. Walls 58, 60, which are perpendicular to blade 56, are tangent to body 36 and also continue at the same conical angles as the body with respect to the body's axis. The upper portion of body 38 continues forwardly to an arcuate rim 62, which is located between the forward and rearward edges 64, 66 of blade 56.

Handle 44 is located on body 36 at the bight of a notch 72 in arcuate rim 62. Handle 44, which has an axis of elongation along the axis of body 36, is connected to a mount 73 by webbing. Mount 73 reinforces body 36 in the vicinity of the handle. At one end of the handle, the webbing includes a riser 74 at the bight of notch 72, and a pair of risers 76, 78 that straddle notch 72. At the other end of the handle, the webbing includes conjunctive risers 80, 82, which join the handle together at their upper extremities and which join mount 73 separately at their lower extremities. A rib 84 extends between risers 74 and 80. The handle has an I-beam plastic construction that maximizes its stability and is large enough to accommodate different hand sizes.

The Rake of FIGS. 9–15.

Claw 46 includes cupped fingers 86 which extend from a wrist 88 and are joined along a knuckle 90. Sheath 49 is provided with ridges 92 that impart rigidity. Sheath 49 provides depending flanks 94, 94 between which handle 52 is anchored. At the back of claw 46 and sheath 49 are a pair of axially aligned catches 96, 98 for the reception of an auxiliary hand tool such as a hand shovel (not shown). The entire rake, with the exception of handle 52, is integrally molded from polymeric sheet.

Alternative Embodiments

The illustrated embodiments are shown as being integral plastic castings. In an alternative embodiment, the collector is cast in separated parts, for example, a separate handle portion and two body portions that are discrete from each other along a plane bisecting these portions along a vertical cross section. In an alternative embodiment, the rake and the handle are cast separately and assembled. The different portions are connected by dove tail or like connections.

Operation

In summary, operation of collector 30 and rake 32 is as follows. The mouth of plastic bag 34 is slipped over egress 38 and drawn forwardly over handle 44. The bag and handle now are gripped by one hand 68. The other hand and arm 70 are fitted through collar 50 until the hand grasps medial handle 52. The handle on the collector balances the unit enabling a downward scooping motion. Moving the hand forwardly enables lifting the collector into an upright orientation for filling the bag. The arrangement is such as to provide total control with only one hand. The handle is designed to work in harmony with the natural motion of the hand, wrist and arm. The collector has a wide opening by which the user is allowed to stand the unit upright to install the bag, and the user can pack the maximum amount of leaves into the collector. Arcuate rim provides a circumferential rib to ensure dimensional stability. The conical shape of the body enables compacting of the leaves as they pass through the body into the bag. The flat forward edge of the scoop stabilizes a unit when on the ground. The rearward circular egress facilitates installation of the bag.

The length of the body allows the user to pack a large quantity of leaves into the unit at one time. The region 100 at the boundary between scoop 56 and body 54 acts as a funnel to compact leaves and other light debris during the collection process. Leaves entering scoop 56 are directed upwardly and inwardly at region 100, thereby concentrating the leaves as they are forced into the body prior to entry into the plastic bag. The user can step inside with one foot to assist in compacting. The body has smooth walls which enable the leaves to slide easily into the bag. The collar of the rake stabilizes the unit on the forearm. The handle of the rake permits the user to control the unit in various angles and motions. The handle and collar cooperate for balance and control. The sheath is oval-shaped in cross-section to accommodate movement of the hand and arm and the exertion of pressure on the talons when catching a pile of leaves. The fingers of the claw are uniformly spaced. When the unit is on the ground, all talons touch the surface at the same time, so that pressure is evenly distributed to all eight fingers. The fingers are spaced apart to avoid wind resistance and to catch sticky and wet packed leaves. The rake is designed to be used with one hand. The user can freely fit his hand and arm into the rake and remove his hand and arm from the rake without using his other hand. Thus the user is free to use his other hand to hold and control the collector. The working of both units at the same time keeps the user's hands free from dirt or injury from any sharp fragment that may be in the debris. By virtue of the open underside of the sheath, the user may use his fingers while still having his arm engaged in the cuff.

What is claimed is:

1. A collector for the collection of leaves and other light debris, said collector integrally including:

(a) a generally conical body portion that rearwardly converges along an axis from a medial plane having a generally circular cross-section to an egress having a generally circular cross-section, said egress cross-section having a smaller diameter than said medial cross-section;

(b) a forwardly projecting scoop portion that defines with said body portion a frustro-circular ingress;

(c) said scoop portion including a substantially planar blade portion and a pair of substantially planar wall portions on opposite sides thereof;

(d) said blade portion being disposed tangentially with respect to said body portion;

(e) said wall portions being disposed tangentially with respect to said body portion;

(f) the forward edge of said body portion having a rim that helps to establish the rigidity of said body portion;

(g) a generally rectangular mount attached to said body portion in a location diametrically opposed to said scoop portion with respect to said axis;

(h) a handle portion that adjoins said mount by webbing along said axis;

(i) said handle being of plastic and having an I-beam construction large enough to accommodate different hand sizes;

(j) said forward edge of said body portion having a notch aligned with and adjacent to said mount and said handle portion;

(k) said webbing including a riser at the bight of said notch and a pair of risers that straddle said notch; and (l) said webbing including two conjunctive risers at the end of said handle opposite said notch, said risers joining together at said handle at their upper extremities and attaching separately to said mount at their lower extremities.

\* \* \* \* \*